(12) United States Patent
Wu et al.

(10) Patent No.: US 12,093,452 B2
(45) Date of Patent: Sep. 17, 2024

(54) MIXED REALITY DISPLAY SYSTEM (71) Applicant: Prilit Optronics, Inc., Tainan (TW)

(72) Inventors: Biing-Seng Wu, Tainan (TW);
Tzung-Ren Wang, Tainan (TW)

(73) Assignee: Prilit Optronics, Inc., Tainan (TW)

( * ) Notice: Subject to any disclaimer, the term of this patent is extended or adjusted under 35 U.S.C. 154(b) by 0 days.

(21) Appl. No.: 18/090,901

(22) Filed: Dec. 29, 2022

(65) Prior Publication Data
US 2023/0229231 A1 Jul. 20, 2023

Related U.S. Application Data (60) Provisional application No. 63/300,843, filed on Jan. 19, 2022.

(51) Int. Cl.
*G06T 19/00* (2011.01)
*A63F 13/213* (2014.01)
*A63F 13/25* (2014.01)
*A63F 13/65* (2014.01)
*G02B 30/24* (2020.01)
*G06F 3/01* (2006.01)
*G09G 3/00* (2006.01)
*G09G 3/32* (2016.01)

(52) U.S. Cl.
CPC ............ *G06F 3/013* (2013.01); *G02B 30/24* (2020.01); *G09G 3/003* (2013.01); *G09G 3/32* (2013.01); *G09G 2320/0233* (2013.01)

(58) Field of Classification Search
CPC ....................................... G09G 3/003
See application file for complete search history.

(56) References Cited

U.S. PATENT DOCUMENTS

| 2010/0201790 | A1* | 8/2010 | Son | G03B 35/26 |
| | | | | 348/58 |
| 2011/0248989 | A1* | 10/2011 | Park | H04N 13/144 |
| | | | | 345/419 |
| 2018/0277591 | A1* | 9/2018 | Wu | H01L 33/60 |
| 2019/0054379 | A1* | 2/2019 | Ackley | G06T 19/006 |
| 2019/0208189 | A1* | 7/2019 | Lau | A63F 13/211 |
| 2019/0273911 | A1* | 9/2019 | Perreault | H10K 59/60 |
| 2020/0234503 | A1* | 7/2020 | Forsland | G06T 19/006 |

* cited by examiner

*Primary Examiner* — Nan-Ying Yang
(74) *Attorney, Agent, or Firm* — Donald E. Stout; Stout, Uxa & Buyan, LLP (57) ABSTRACT A mixed reality display system includes a transparent display, through which users on both sides see each other; a plural pairs of shutter glasses worn by the users, each pair of shutter glasses being composed of a left glass and a right glass; and a controller that synchronizes the transparent display and the shutter glasses.

11 Claims, 11 Drawing Sheets

Basic mode (2D content)

FIG. 2

Single-side multiple-players mode (3D content)
turn on: L glass of user A→R glass of user A→L glass of user B→R glass of user B

MIXED REALITY DISPLAY SYSTEM

CROSS-REFERENCE TO RELATED APPLICATIONS

This application claims the benefit of U.S. Provisional Application No. 63/300,843, filed on Jan. 19, 2022, the entire content of which are herein expressly incorporated by reference.

BACKGROUND OF THE INVENTION

1. Field of the Invention

The present invention generally relates to mixed reality, and more particularly to a mixed reality display system.

2. Description of Related Art

Mixed reality (MR) is the merging of real and virtual worlds to produce new environments and visualizations, where physical and digital objects co-exist and interact in real time. Therefore, physical elements may be dynamically integrated into and can interact with the virtual world in real time. Mixed reality has been used in applications across fields including design, education, entertainment, military training, healthcare, product content management, and operation of robots.

MR can provide immersive experience for users that traditional displays cannot achieve. However, in the conventional MR display system, it is difficult for users to see each other and virtual objects at the same scene.

A need has thus arisen to propose a novel scheme to overcome drawbacks of the conventional MR display system.

SUMMARY OF THE INVENTION

In view of the foregoing, it is an object of the embodiment of the present invention to provide a mixed reality display system operable in multiple modes and capable of compensating incomparable or distinct luminances on different sides of a transparent display.

According to one embodiment, a mixed reality display system includes a transparent display, a plural pairs of shutter glasses and a controller. Users on both sides see each other through the transparent display. The shutter glasses are worn by the users, and each pair of shutter glasses is composed of a left glass and a right glass. The controller synchronizes the transparent display and the shutter glasses.

DETAILED DESCRIPTION OF THE INVENTION

Figure 1A:
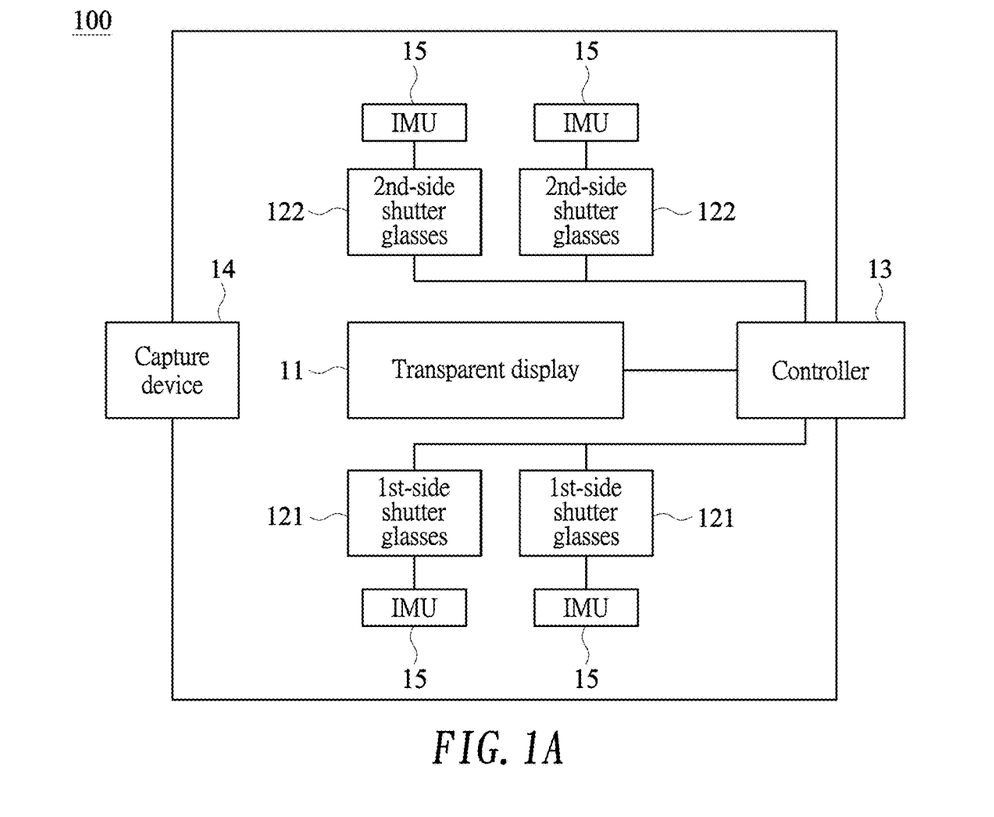
FIG. 1A shows a block diagram illustrating a mixed reality (MR) display system according to one embodiment of the present invention.
Figure 1B:
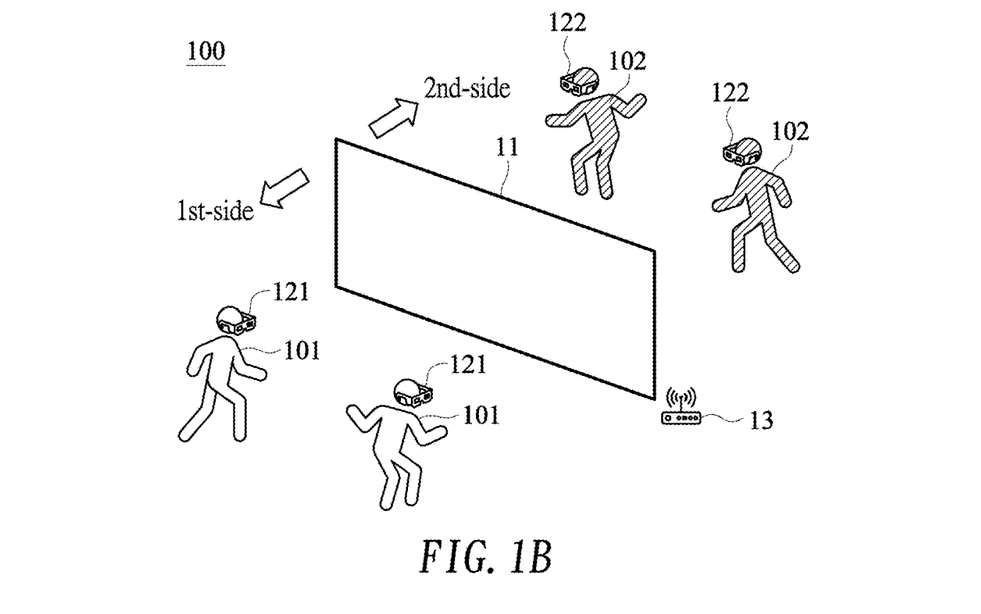
FIG. 1B shows a schematic diagram illustrating the MR display system of FIG. 1A.

FIG. 1A shows a block diagram illustrating a mixed reality (MR) display system 100 according to one embodiment of the present invention, and FIG. 1B shows a schematic diagram illustrating the MR display system 100 of FIG. 1A.

Specifically, the MR display system 100 of the embodiment may include a transparent display 11 that is a two-sided display, through which users on both sides (e.g., first-side users 101 on a first-side or front-side of the transparent display 11 and second-side users 102 on a second-side or back-side of the transparent display 11) may see each other. The transparent display 11 may include a micro-light-emitting diode (microLED) display, an organic light-emitting diode (OLED) display or a liquid-crystal display (LCD). The transparent display 11 may primarily include a transparent substrate, for example, made of glass or polyimide (PI).

In the embodiment, the MR display system 100 may include a plural pairs of first-side shutter glasses 121 that may be worn by the first-side users 101, and a plural pairs of second-side shutter glasses 122 that may be worn by the second-side users 102. The (first-side and second-side) shutter glasses 121 and 122 may each be composed of a left glass for left eye and a right glass for right eye, which may be controllably turned on (i.e., transparent) or turned off (i.e., opaque) individually. In one embodiment, the (first-side and second-side) shutter glasses 121 and 122 may be made of liquid crystal (LC), which may become transparent (i.e., turn on) or opaque (i.e., turn off) by applying different voltages.

The MR display system 100 of the embodiment may include a controller 13 configured to synchronize (or coordinate) the transparent display 11 and the (first-side and second-side) shutter glasses 121 and 122, for example, by a wireless scheme.

Figure 2:
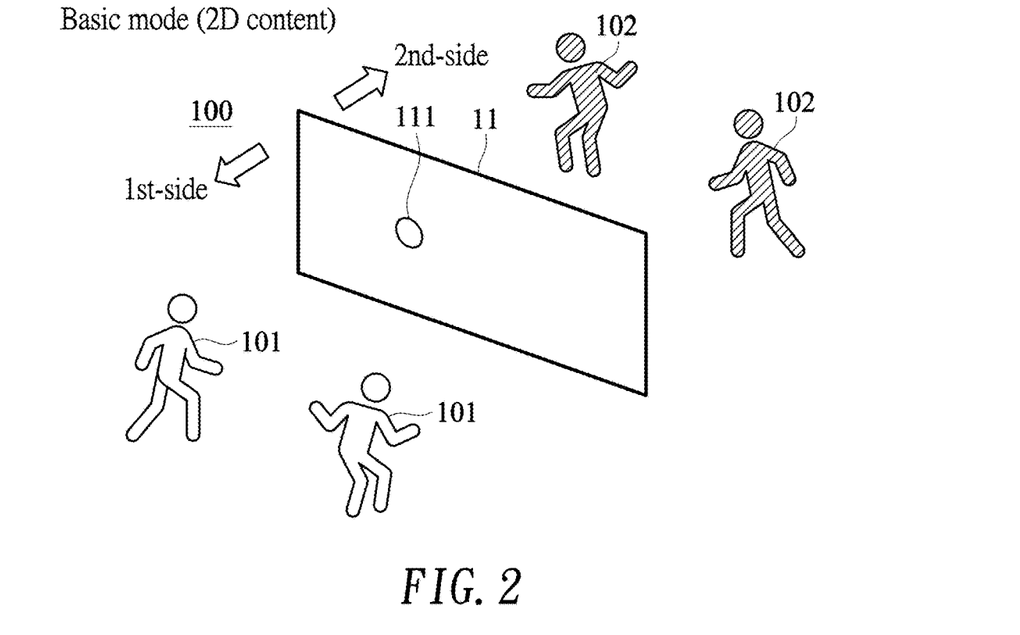
FIG. 2 shows a schematic diagram illustrating a basic mode operable in the MR display system.

FIG. 2 shows a schematic diagram illustrating a basic mode operable in the MR display system 100. Specifically, in the basic mode, users (i.e., the first-side users 101 and the second-side users 102) on both sides of the transparent display 11 do not wear (first-side and second-side) shutter glasses 121 and 122 or, alternatively, wear (first-side and second-side) shutter glasses 121 and 122 that are always transparent. Accordingly, users on both sides of the transparent display 11 see a same object 111 as shown, and the display content perceived by the user is two dimensional (2D).

Figure 3A:
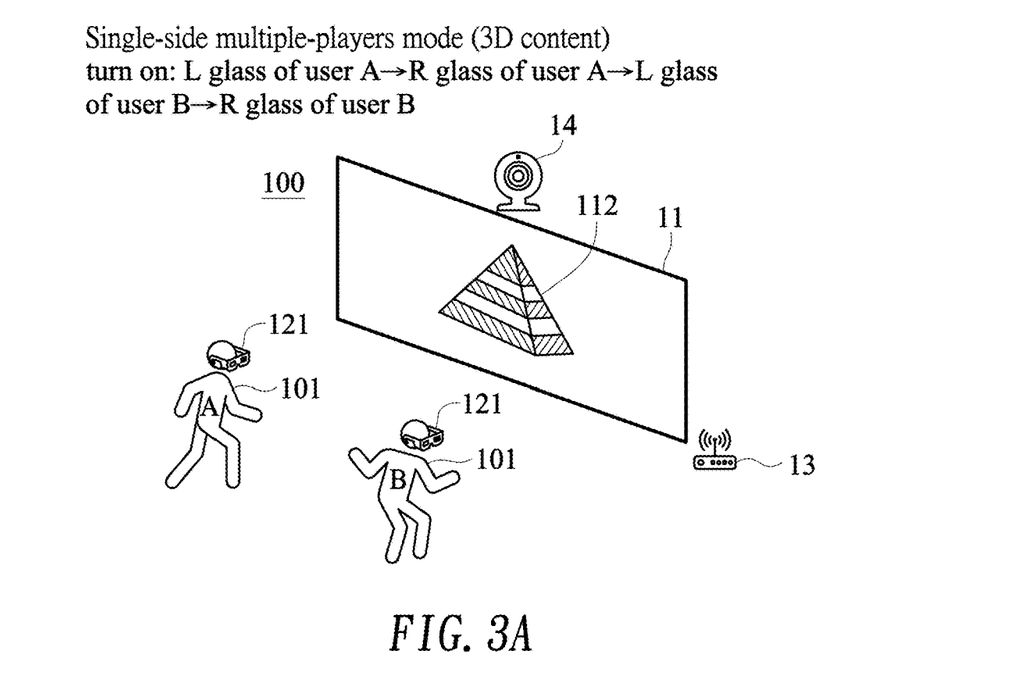
FIG. 3A shows a schematic diagram illustrating a single-side multiple-players mode operable in the MR display system.

FIG. 3A shows a schematic diagram illustrating a single-side multiple-players mode operable in the MR display system 100. Specifically, in the single-side multiple-players mode, users on only one side (e.g., the first-side users 101) wear the shutter glasses (e.g., the first-side shutter glasses 121). The left glasses and the right glasses of the shutter glasses 121 are sequentially turned on (by the controller 13) in a predetermined order such that only one glass is turned on at a time, and the display content perceived by the user is three dimensional (3D). As exemplified in FIG. 3A, the controller 13 sequentially turns on the left (L) glass of the user A, the right (R) glass of the user A, the left glass of the user B and the right glass of the user B, thereby resulting in a four-phases operation.

Figure 3B:
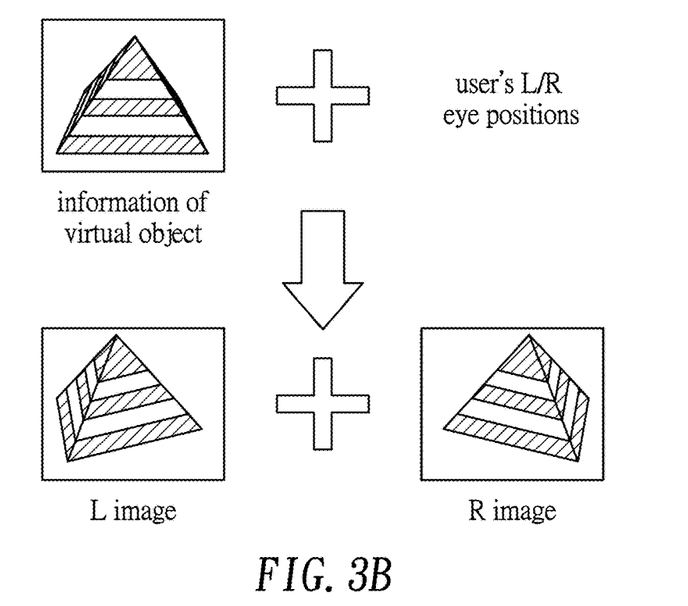
FIG. 3B shows a schematic diagram illustrating the rendering of left and right images.
Figure 3C:
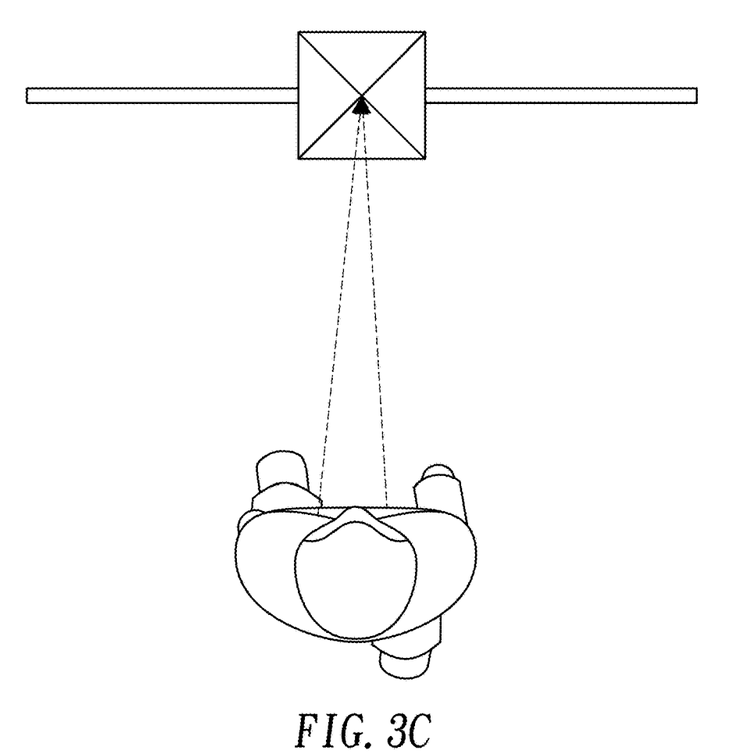
FIG. 3C schematically shows a top view of a user.

The MR display system 100 of the embodiment may further include a capture device 14, such as a RGB (red-green-blue) or RGBD (red-green-blue-depth) camera, configured to obtain an environment picture, according to which left/right eye positions of a user may be obtained. FIG. 3B shows a schematic diagram illustrating the rendering of left and right images, and FIG. 3C schematically shows a top view of a user. In the embodiment, left and right images may be properly rendered according to the obtained left/right eye positions and information (e.g., size, position and texture) of a virtual object 112. In an alternative embodiment, instead of using the capture device 14, the shutter glasses 121/122 may include an inertial measurement unit (IMU) 15 (FIG. 1A) configured to obtain left-right eye positions of the user 101/102.

Figure 3D:
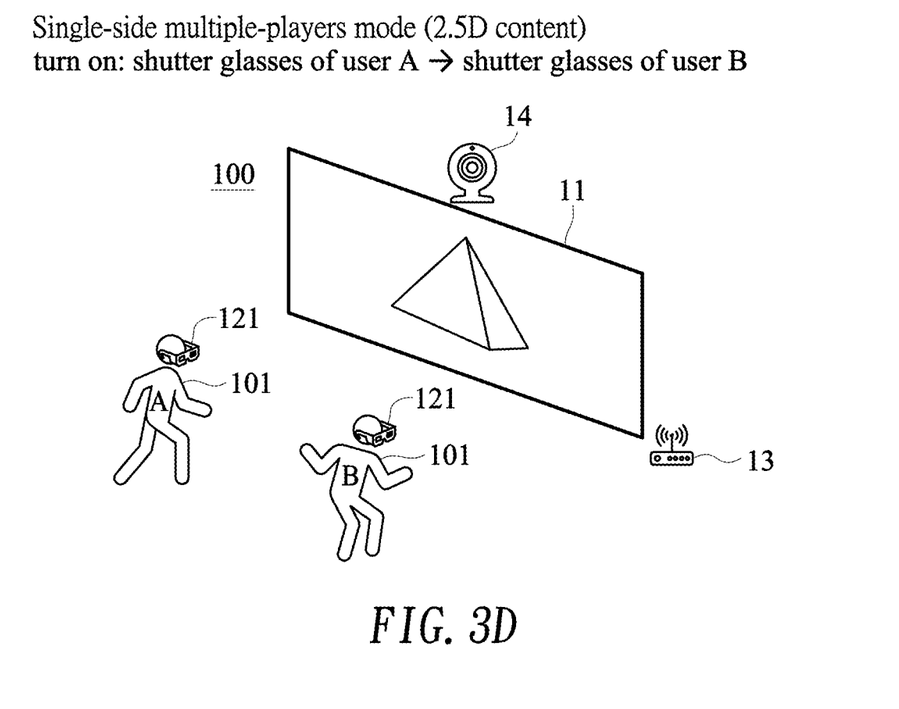
FIG. 3D shows a schematic diagram illustrating another single-side multiple-players mode operable in the MR display system.

FIG. 3D shows a schematic diagram illustrating another single-side multiple-players mode operable in the MR display system 100. The single-side multiple-players mode of FIG. 3D is similar to the single-side multiple-players mode of FIG. 3A with the following exception. In the present embodiment, the (first-side) shutter glasses 121 of the (first-side) users are sequentially turned on (by the controller 13) in a predetermined order such that only one pair of shutter glasses is turned on at a time. As exemplified in FIG. 3D, (both the left and right glasses of) the shutter glasses 121 of the user A is turned on, followed by turning on (both the left and right glasses of) the shutter glasses 121 of the user B. The single-side multiple-players mode of FIG. 3D is called 2.5D because the display content perceived by the user A may be different from the user B.

Figure 4A:
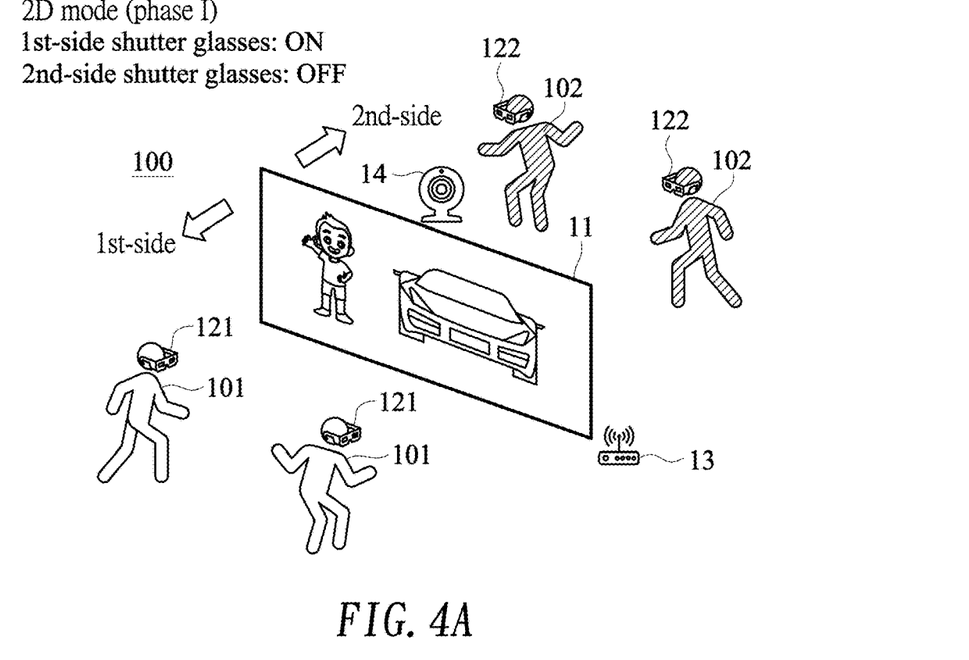
FIG. 4A and FIG. 4B show schematic diagrams illustrating a two-dimensional (2D) mode operable in the MR display system.
Figure 4B:
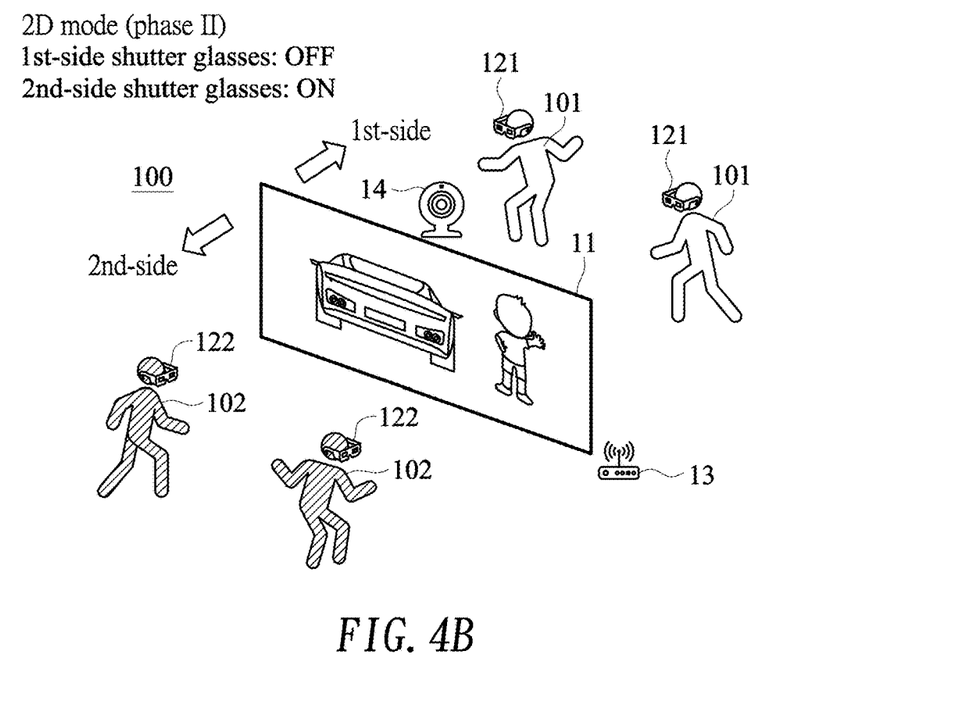

FIG. 4A and FIG. 4B show schematic diagrams illustrating a two-dimensional (2D) mode operable in the MR display system 100. Specifically, in the 2D mode, users on both sides of the transparent display 11 (i.e., the first-side users 101 and the second-side users 102) wear (first-side and second-side) shutter glasses 121 and 122. In the 2D mode, the first-side shutter glasses 121 (of the first-side users 101) and the second-side shutter glasses 122 (of the second-side users 102) are turned on in turns such that glasses on only one side are turned on at a time, and the display content perceived by the user 101/102 is 2D.

Specifically speaking, in a first phase of the 2D mode as shown in FIG. 4A, (both the left and right glasses of) only the first-side shutter glasses 121 are turned on (by the controller 13), while (both the left and right glasses of) the second-side shutter glasses 122 are turned off. Subsequently, in a second phase of the 2D mode as shown in FIG. 4B, (both the left and right glasses of) only the second-side shutter glasses 122 are turned on (by the controller 13), while (both the left and right glasses of) the first-side shutter glasses 121 are turned off. Therefore, the first-side users 101 see in the first phase a (2D) view (e.g., fronts of a person and a vehicle) that is different from another (2D) view (e.g., backs of the person and the vehicle) seen in the second phase by the second-side users 102.

FIG. 5A to FIG. 5D show schematic diagrams illustrating a three-dimensional (3D) mode operable in the MR display system 100. Specifically, in the 3D mode, users on both sides of the transparent display 11 (i.e., the first-side users 101 and the second-side users 102) wear (first-side and second-side) shutter glasses 121 and 122. In the 3D mode, the first-side shutter glasses 121 and the second-side shutter glasses 122 are turned on in turns (as in the 2D mode), and, in addition, the left glasses and the right glasses are turned on in turns such that only either left glasses or right glasses of only one side are turned on at a time.

Figure 5A:
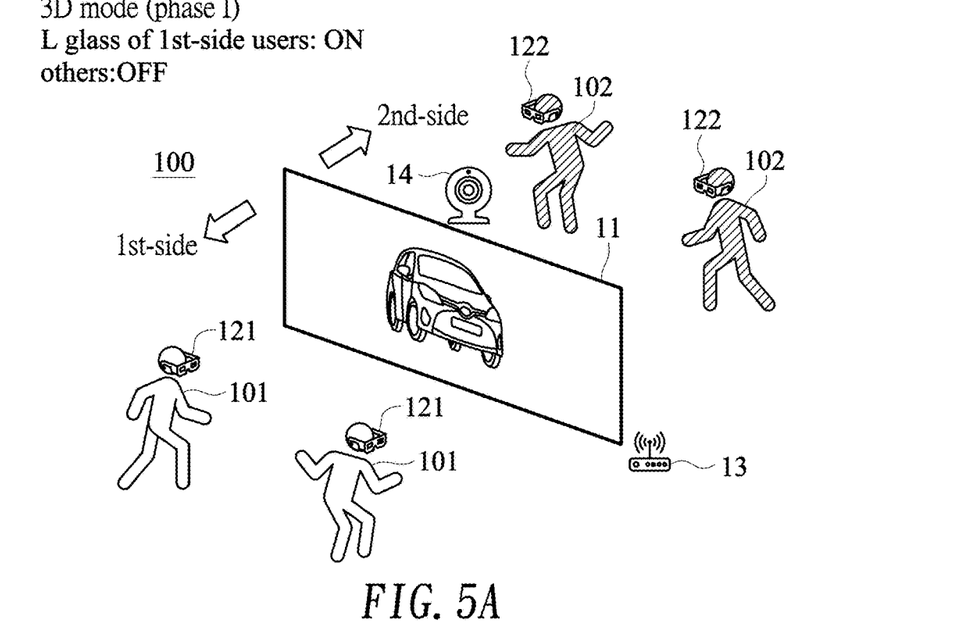
FIG. 5A to FIG. 5D show schematic diagrams illustrating a three-dimensional (3D) mode operable in the MR display system.

Specifically speaking, in a first phase of the 3D mode as shown in FIG. 5A, only the left glasses of the first-side users 101 are turned on, while the right glasses of the first-side users 101 and both left and right glasses of the second-side users 102 are turned off.

Figure 5B:
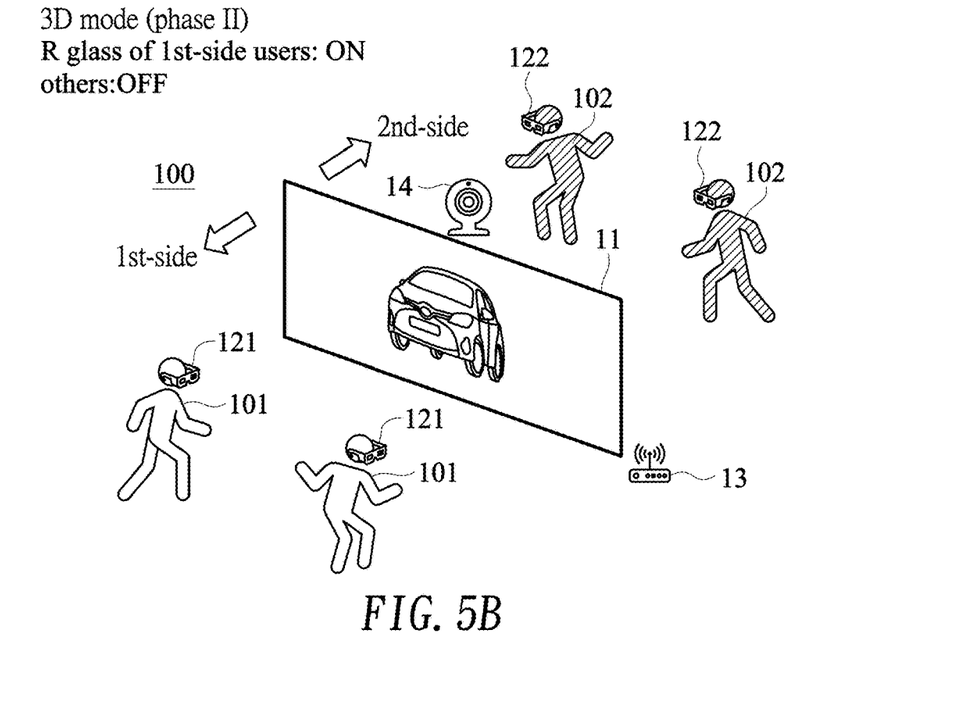

In a second phase of the 3D mode as shown in FIG. 5B, only the right glasses of the first-side users 101 are turned on, while the left glasses of the first-side users 101 and both left and right glasses of the second-side users 102 are turned off.

Figure 5C:
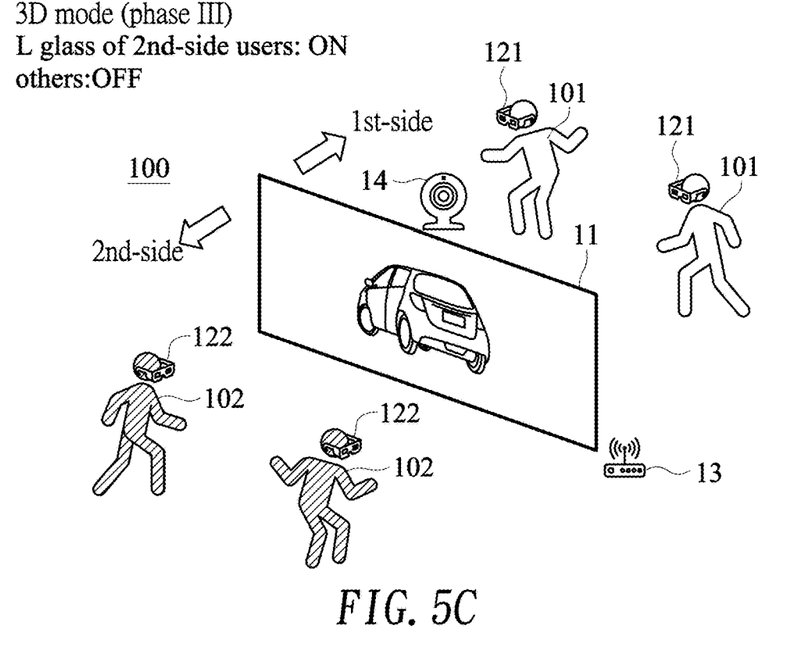

In a third phase of the 3D mode as shown in FIG. 5C, only the left glasses of the second-side users 102 are turned on, while the right glasses of the second-side users 102 and both left and right glasses of the second-side users 101 are turned off.

Figure 5D:
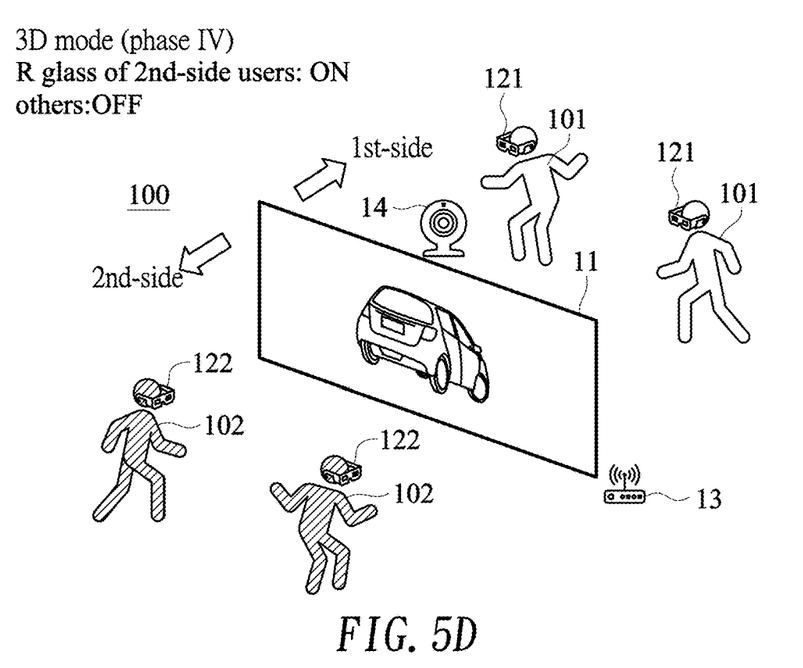

In a fourth phase of the 3D mode as shown in FIG. 5D, only the right glasses of the second-side users 102 are turned on, while the left glasses of the second-side users 102 and both left and right glasses of the first-side users 101 are turned off.

Therefore, the first-side users 101 see in the first and second phases a (3D) view (e.g., front of a vehicle) that is different from another (3D) view (e.g., back of the vehicle) seen in the third and fourth phases by the second-side users 102.

Figure 5E:
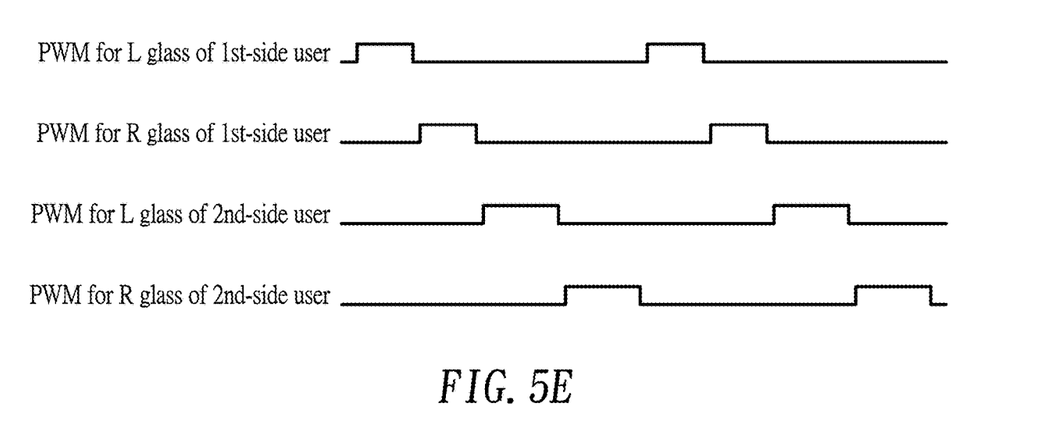
FIG. 5E shows a timing diagram illustrating signals (e.g., pulse-width modulation (PWM) signals) for controlling (turn on and off of) the (first-side and second-side) shutter glasses.

FIG. 5E shows a timing diagram illustrating signals (e.g., pulse-width modulation (PWM) signals) for controlling (turn on and off of) the (first-side and second-side) shutter glasses 121 and 122.

It is noted that luminance of the first-side (e.g., front-side) of the transparent display 11 is commonly different from (e.g., greater than) luminance of the second-side (e.g., back-side) of the transparent display 11. According to one aspect of the embodiment, a duty cycle (i.e., proportion of on-time to a period) of the PWM signal for the first-side shutter glasses 121 is shorter than a duty cycle of the PWM signal for the second-side shutter glasses 122, thereby compensating the incomparable or distinct luminances on different sides of the transparent display 11. In one embodiment, a duty cycle ratio of the PWM signal for the first-side shutter glasses 121 to the PWM signal for the second-side shutter glasses 122 is approximately equal to a luminance ratio of the second-side of the transparent display 11 to the first-side of the transparent display 11.

Figure 6A:
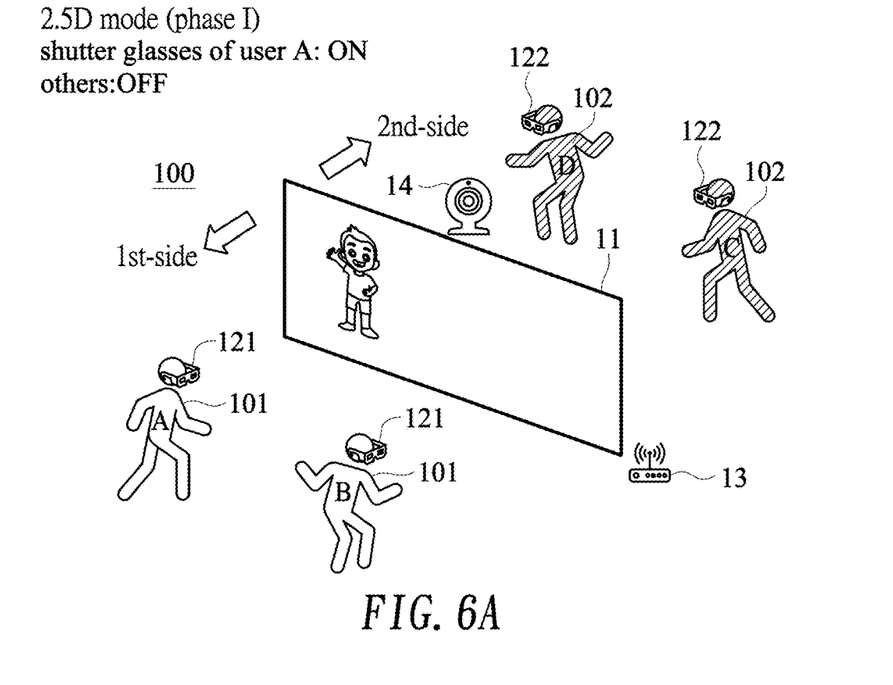
FIG. 6A to FIG. 6D show schematic diagrams illustrating a two-and-half-dimensional (2.5D) mode operable in the MR display system.
Figure 6B:
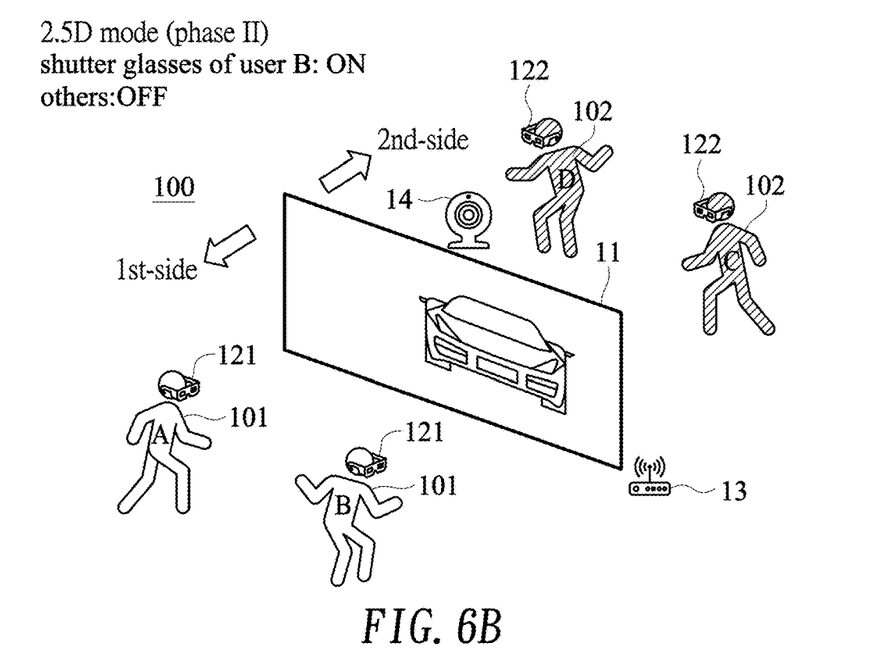
Figure 6C:
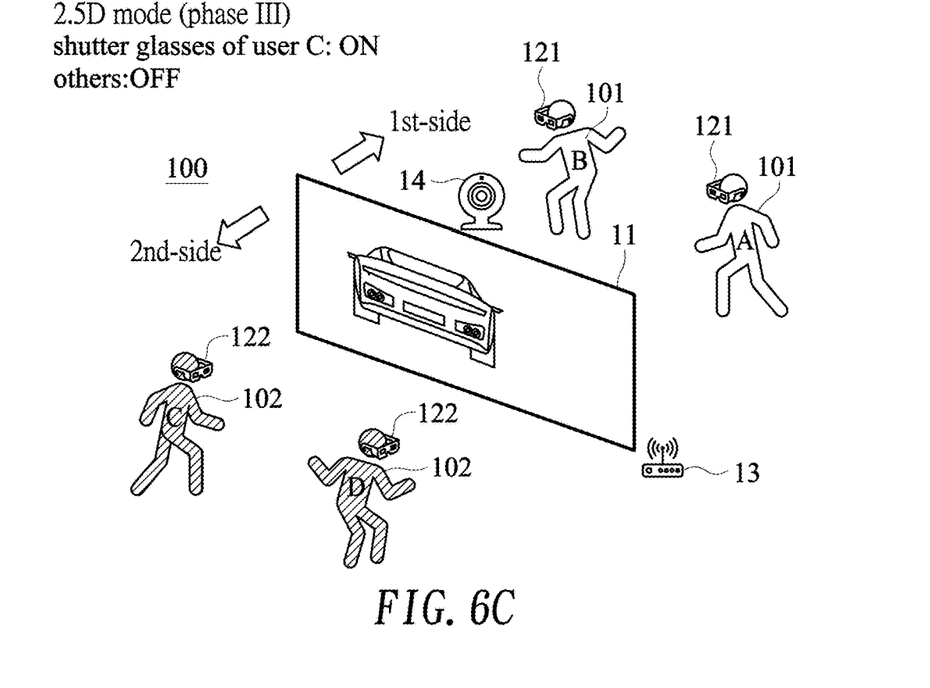
Figure 6D:
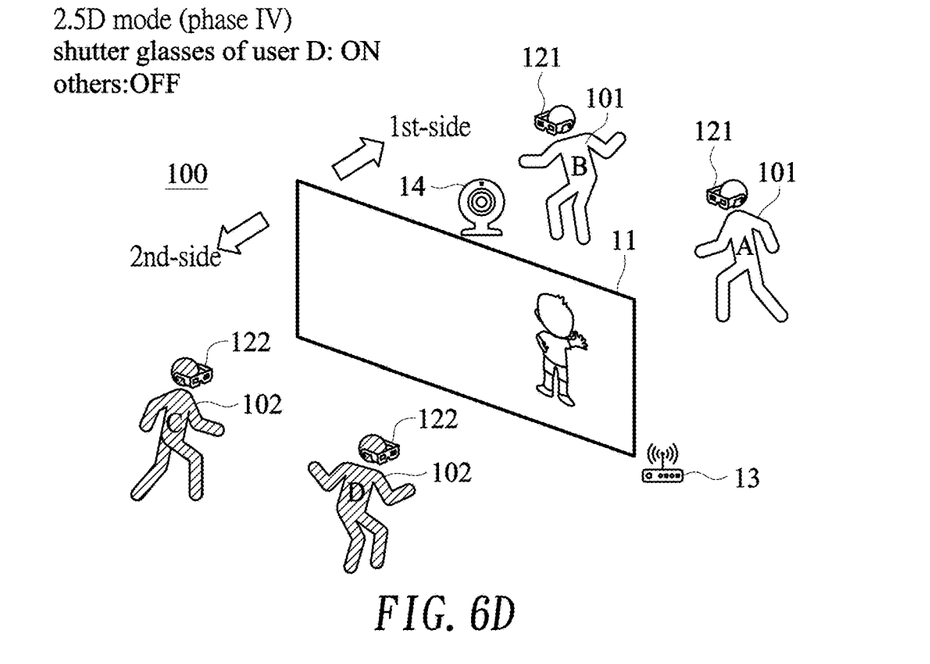
Figure 6E:
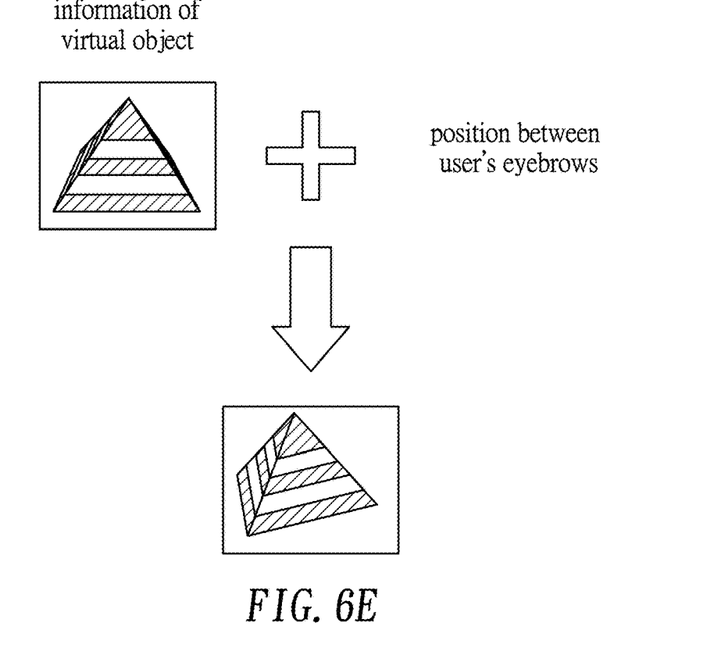
FIG. 6E shows a schematic diagram illustrating the rendering of an image with 2.5D display content.
Figure 6F:
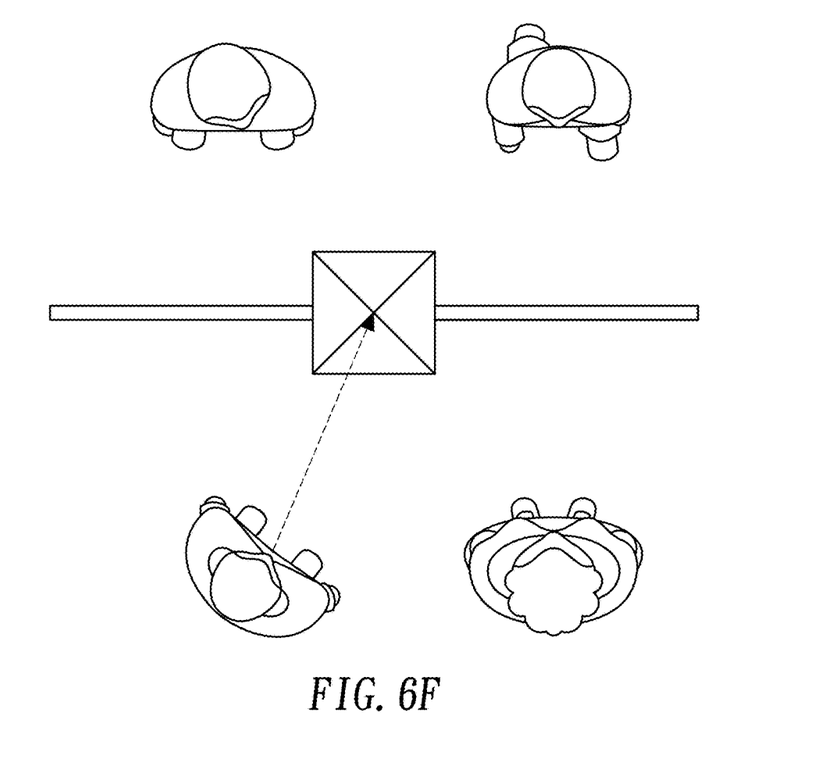
FIG. 6F schematically shows a top view of users.

FIG. 6A to FIG. 6D show schematic diagrams illustrating a two-and-half-dimensional (2.5D) mode operable in the MR display system 100. The 2.5D mode of FIG. 6A-FIG. 6D is similar to the 3D mode of FIG. 5A-FIG. 5D with the following exception. In the present embodiment, the shutter glasses 121/122 of the users 101/102 are sequentially turned on (by the controller 13) in a predetermined order such that only one pair of shutter glasses is turned on at a time. Accordingly, as exemplified in FIG. 6A-FIG. 6D, the display contents perceived by the users (e.g., user A and user B) on a same side may be different from each other. FIG. 6E shows a schematic diagram illustrating the rendering of an image with 2.5D display content, and FIG. 6F schematically shows a top view of users. In the embodiment, the image may be properly rendered according to a position between user's eyebrows (instead of both eye positions) and information (e.g., size, position and texture) of a virtual object.

Although specific embodiments have been illustrated and described, it will be appreciated by those skilled in the art that various modifications may be made without departing from the scope of the present invention, which is intended to be limited solely by the appended claims.

What is claimed is:

1. A mixed reality display system, comprising:
a transparent display, through which users on both sides see each other;
a plural pairs of shutter glasses worn by the users, each pair of shutter glasses being composed of a left glass and a right glass; and
a controller that synchronizes the transparent display and the shutter glasses;
wherein the transparent display displays content on its own;
wherein first-side shutter glasses worn by first-side users and second-side shutter glasses worn by second-side users are turned on in turns;
wherein the shutter glasses are controlled to turn on or off by pulse-width modulation (PWM) signals respectively, and a duty cycle of a PWM signal for first-side shutter glasses is different from a duty cycle of the PWM signal for second-side shutter glasses to compensate different luminances on different sides of the transparent display.

2. The system of claim 1, wherein the transparent display comprises a micro-light-emitting diode display.

3. The system of claim 1, wherein the left glass and the right glass are made of liquid crystal, which is turned on to become transparent or is turned off to become opaque by applying different voltages.

4. The system of claim 1, wherein first-side shutter glasses worn by first-side users and second-side shutter glasses worn by second-side users are turned on in turns in a two-dimensional mode, in which glasses on only one side are turned on at a time.

5. The system of claim 1, wherein first-side shutter glasses worn by first-side users and second-side shutter glasses worn by second-side users are turned on in turns, and left glasses and right glasses are turned on in turns in a three-dimensional mode, in which only either left glasses or right glasses of only one side are turned on at a time.

6. The system of claim 1, wherein first-side shutter glasses worn by first-side users and second-side shutter glasses worn by second-side users are turned on in turns in a two-and-half-dimensional (2.5D) mode, in which only one pair of shutter glasses is turned on at a time.

7. The system of claim 1, further comprising:
a capture device that obtains an environment picture, according to which left and right eye positions of a user is obtained, and a left image and a right image are rendered according to the obtained left and right eye positions and information of a virtual object, or a single image is rendered according to a position between user's eyebrows and information of the virtual object.

8. The system of claim 7, wherein the information of the virtual object comprises size, position and texture of the virtual object.

9. The system of claim 1, further comprising:
an inertial measurement unit that obtains left and right eye positions of a user, and a left image and a right image are rendered according to the obtained left and right eye positions and information of a virtual object, or a single image is rendered according to a position between user's eyebrows and information of the virtual object.

10. The system of claim 1, wherein a duty cycle ratio of the PWM signal for the first-side shutter glasses to the PWM signal for the second-side shutter glasses is approximately equal to a luminance ratio of second-side of the transparent display to first-side of the transparent display.

11. The system of claim 1, wherein luminance of first-side of the transparent display is greater than luminance of second-side of the transparent display, and the duty cycle of a PWM signal for the first-side shutter glasses is less than the duty cycle of the PWM signal for the second-side shutter glasses.

* * * * *